(12) United States Patent
Rosseel

(10) Patent No.: US 6,412,511 B1
(45) Date of Patent: Jul. 2, 2002

(54) VALVE FOR A MOTOR VEHICLE FUEL TANK

(75) Inventor: Alexis Rosseel, Compiegne (FR)

(73) Assignee: Compagnie Plastic Omnium, Lyons (FR)

( * ) Notice: Subject to any disclaimer, the term of this patent is extended or adjusted under 35 U.S.C. 154(b) by 0 days.

(21) Appl. No.: 09/745,556

(22) Filed: Dec. 26, 2000

(30) Foreign Application Priority Data

Dec. 23, 1999 (FR) .............................................. 99 16354

(51) Int. Cl.⁷ .............................................. F16K 24/04
(52) U.S. Cl. ........................... 137/43; 137/202; 137/587
(58) Field of Search ........................... 137/43, 202, 587

(56) References Cited

U.S. PATENT DOCUMENTS

| | | | |
|---|---|---|---|
| 4,991,615 A | * | 2/1991 | Szlaga et al. ........... 137/202 X |
| 5,259,412 A | | 11/1993 | Scott et al. |
| 5,261,439 A | | 11/1993 | Harris |
| 5,590,697 A | * | 1/1997 | Benjey et al. .......... 137/202 X |
| 5,954,082 A | * | 9/1999 | Waldorf et al. ............. 137/202 |
| 5,960,816 A | * | 10/1999 | Mills et al. .................. 137/202 |
| 5,996,607 A | * | 12/1999 | Bergsma et al. ............ 137/202 |
| 6,085,771 A | * | 7/2000 | Benjey et al. .......... 137/202 X |
| 6,145,532 A | * | 11/2000 | Tuckey et al. .............. 137/202 |

FOREIGN PATENT DOCUMENTS

DE 44 00 450 A1 7/1994

* cited by examiner

Primary Examiner—Gerald A. Michalsky
(74) Attorney, Agent, or Firm—Oliff & Berridge, PLC

(57) ABSTRACT

A fuel tank valve for connection to a degassing circuit to define a passage for a flow of gas leaving the tank, the valve being characterized by the fact that it has at least one moving member (18; 55) capable of being controlled in displacement to modify the configuration of said valve (1; 42), and by the fact that the valve has a first moving closure element (26; 65) having an orifice (29; 67) and suitable for being moved by the moving member (18; 55) from a first position towards a second position, the transition from the first position to the second position reducing the flow section made available to the flow of gas.

17 Claims, 5 Drawing Sheets

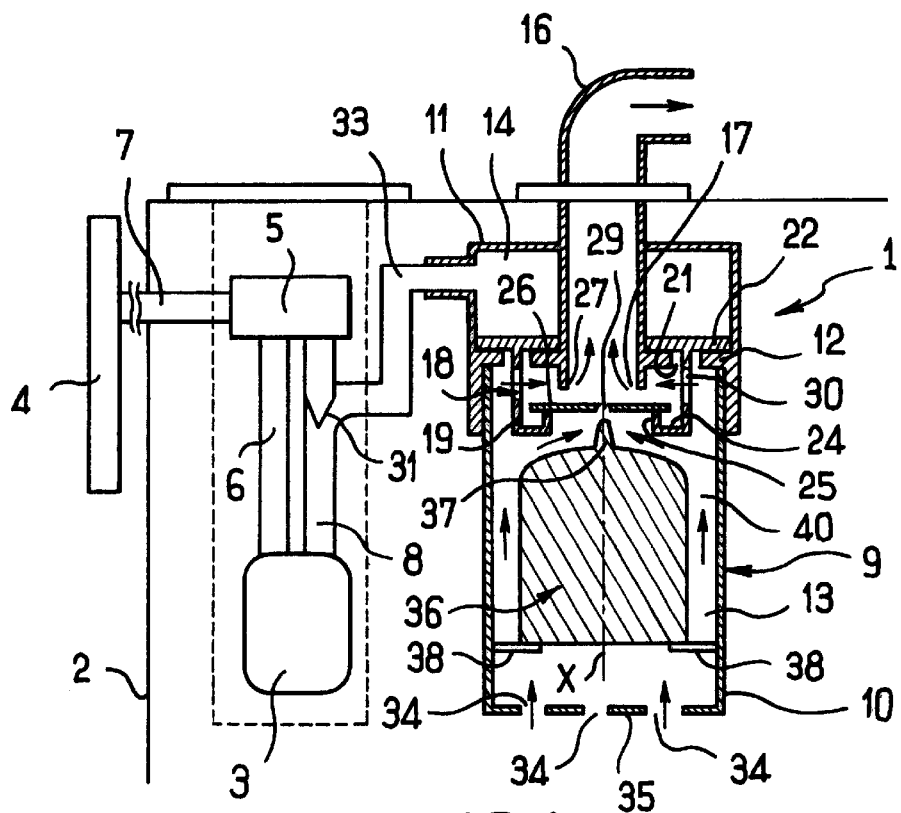
FIG_1
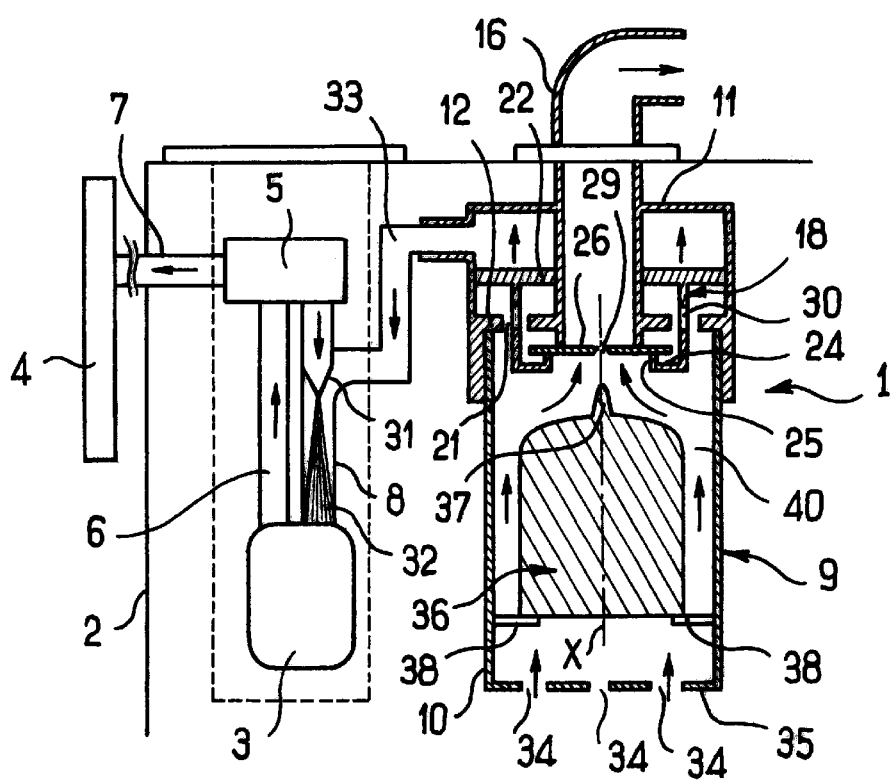
FIG_2

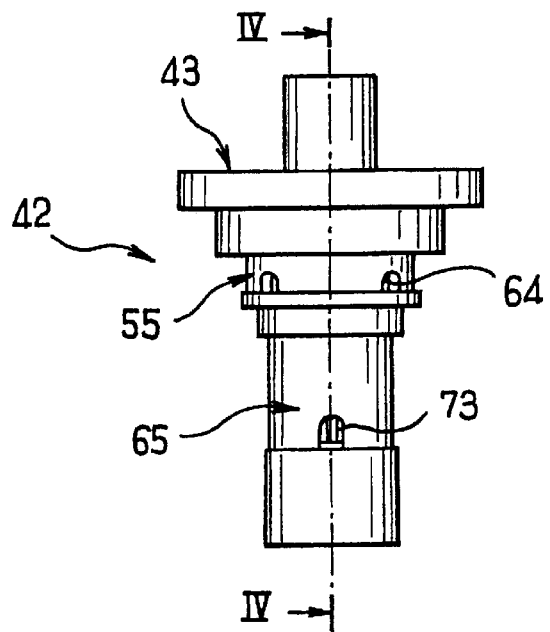
FIG_3
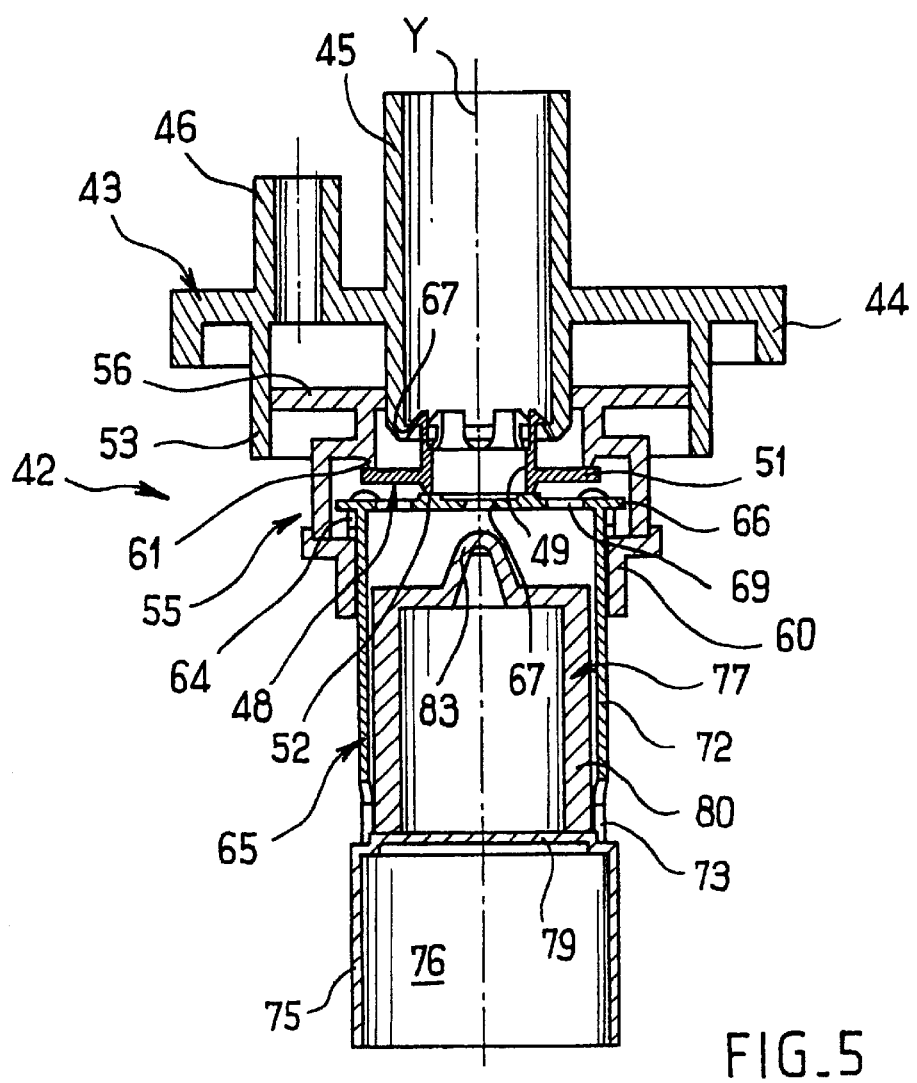
FIG_5

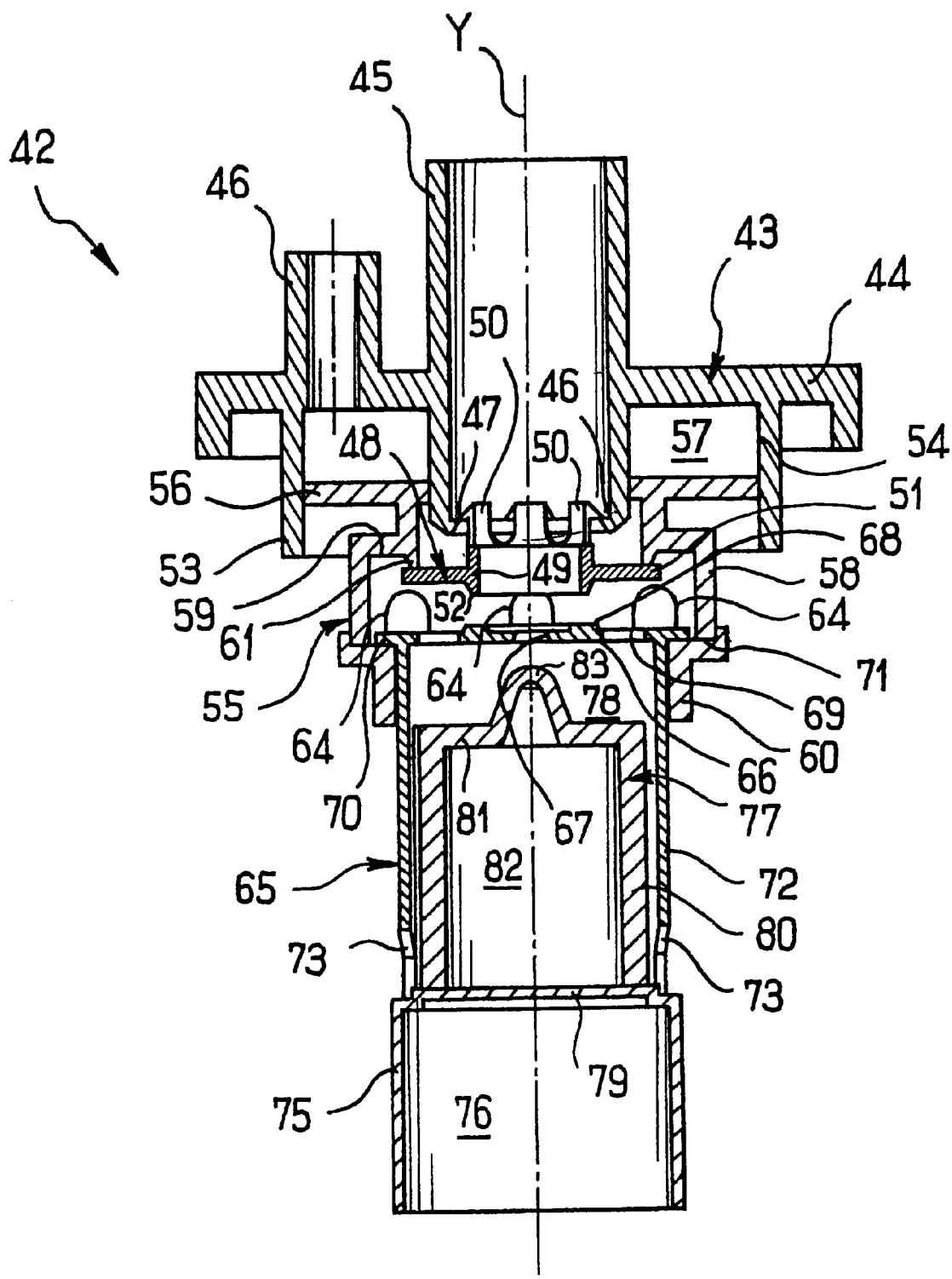
FIG_4

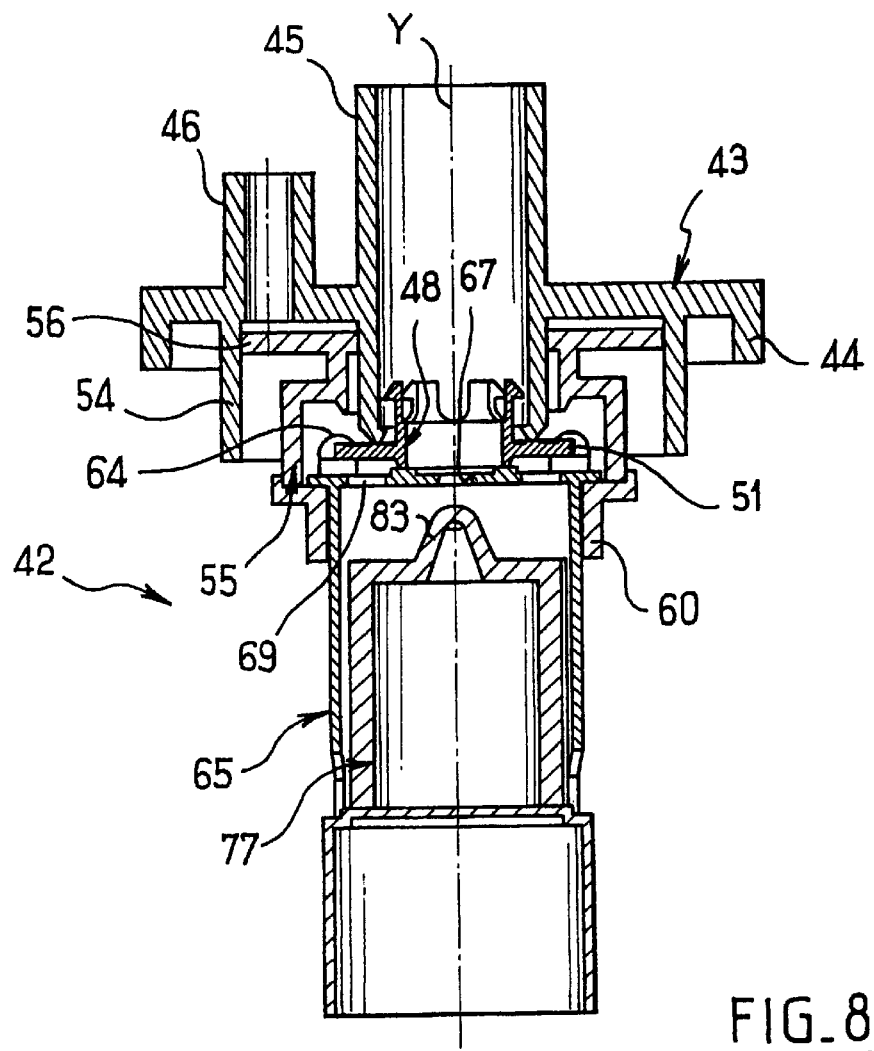
FIG_8
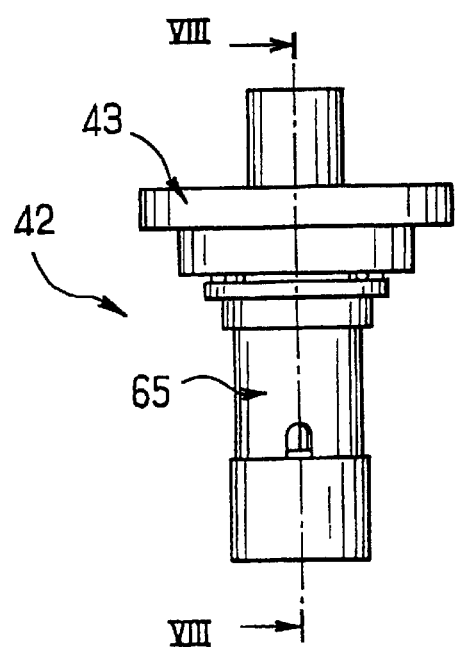
FIG_7

VALVE FOR A MOTOR VEHICLE FUEL TANK

The present invention relates to a valve for a motor vehicle fuel tank.

The invention relates more particularly to a valve for connecting to a degassing circuit, firstly to enable the air contained in the tank to be evacuated while the tank is being filled, and secondly to allow the tank to breathe.

The degassing circuit generally communicates with the atmosphere via an activated carbon filter, also known as a "cannister", that is intended to prevent fuel vapor being rejected into the atmosphere.

It is desirable to prevent droplets of fuel being entrained into the degassing circuit and reaching the cannister while the vehicle is running since that would rapidly saturate the cannister and cause it to lose its effectiveness.

The present invention provides a novel valve capable simultaneously of allowing the tank to be ventilated effectively during filling, of avoiding overfilling, and of subsequently allowing the tank to breathe, while also reducing the risk of liquid fuel reaching the degassing circuit while the vehicle is running.

The valve of the invention is for connection to a degassing circuit defining a passage for the flow of gas leaving the tank, and the valve comprising at least one moving member capable of being controlled in displacement to modify the configuration of the valve, and a first moving valve element including an orifice and suitable for being driven in displacement by the moving member from a first position towards a second position, changeover from the first position to the second reducing the flow section available to the flow of gas.

By means of the invention, the valve can be configured in such a manner that tank ventilation takes place either with gas flow at a high rate during filling, or else at a low rate with small risk of liquid fuel being splashed towards the cannister, particularly while the vehicle is running.

In a particular embodiment, the configuration of the valve is modified by the energy of a fuel pump, which is advantageously the same as the pump that is used for delivering fuel to the injectors of the engine.

The valve is advantageously arranged in such a manner that said moving member can be entrained to move under the effect of the fuel pump operating.

In a particular embodiment, the valve is arranged so that the moving member is entrained to move from the first position towards the second position under the effect of a variation in pressure created by the pump operating.

Advantageously, said variation in pressure is suction created by the Venturi effect.

In particular embodiment, the valve has a second closure element suitable for closing the orifice of the first closure element.

This second closure element advantageously closes said orifice in the event of the vehicle accidentally rolling over.

In a particular embodiment, the second closure element has positive buoyancy so as to close said orifice under the effect of a wave of fuel sloshing in the tank.

In a particular embodiment, the first closure element bears against a fixed seat when in its second position.

In another particular embodiment, the valve has an element forming a moving seat, and the first closure element bears against it when it is in its second position providing partial closure.

This seat-forming element is advantageously movable between a position in which it comes into abutment against said moving member and a position in which it is engaged on a rim of a fixed portion of the valve.

In a particular embodiment, the first closure element presents positive buoyancy, the valve being further arranged so that the first closure element takes up its partial closure position under the effect of liquid fuel rising in the tank at the end of filling.

In a particular embodiment, the first closure element needs to be moved upwards to go from the first position to the second position.

In a particular embodiment, the valve comprises:

a member that is movable along a substantially vertical axis from a low position while the tank is being filled and the engine is switched off to a high position while the engine is running;

a seat-forming element that is movable between a low position in which it is hooked on a fixed portion of the valve and supports the moving member, and a high position in which it comes into abutment against said fixed portion;

a first closure element presenting an orifice and that is movable when the moving member is in its low position between a first position in which it is spaced apart from seat-forming element and a second position in which it bears against said seat-forming element and reduces the flow section available to the flow of gas leaving the valve, allowing the flow to take place through said orifice only, said first closure element presenting positive buoyancy so as to go from its first position towards its second position under the effect of the fuel rising in the tank;

a second closure element that is movable relative to the first closure element between a first position in which its weight acts on the first closure element and a second position in which it closes said orifice, said second closure element presenting positive buoyancy so as go from its first position towards its second position under the effect of the liquid fuel rising in the tank and close the valve when the tank is at the end of filling and the engine is switched off, the moving member then being in its low position;

in which valve, once the engine is running, the moving member is in its high position and has entrained the seat-forming element into a high position with the first closure element held to bear against the seat-forming element by said moving member, the orifice of the first closure element then being normally open in the absence of waves of fuel in the tank, and the second closure element being suitable for closing said orifice under the effect of a wave of fuel in the tank.

The invention also provides a motor vehicle fuel tank fitted with a valve as specified above.

Other characteristics and advantages of the present invention will appear on reading the following detailed description of non-limiting embodiments of the invention and on examining the accompanying drawings, in which:

FIG. 1 is a diagrammatic view of a valve constituting a first embodiment of the invention, while the vehicle is at rest;

FIG. 2 shows the FIG. 1 valve when the engine is running;

FIG. 3 is an elevation view of a valve constituting a second embodiment of the invention;

FIG. 4 is a longitudinal section view on section line IV—IV of FIG. 3 showing the valve at the beginning of filling;

FIG. 5 is a section analogous to FIG. 4, showing the valve shortly before the end of filling;

FIG. 7 is an elevation view showing the valve while the vehicle is running; and FIG. 8 is a section analogous to FIG. 4, showing the valve while the vehicle is running.

FIGS. 1 and 2 show a valve 1 constituting a first embodiment of the invention.

Figure 6:
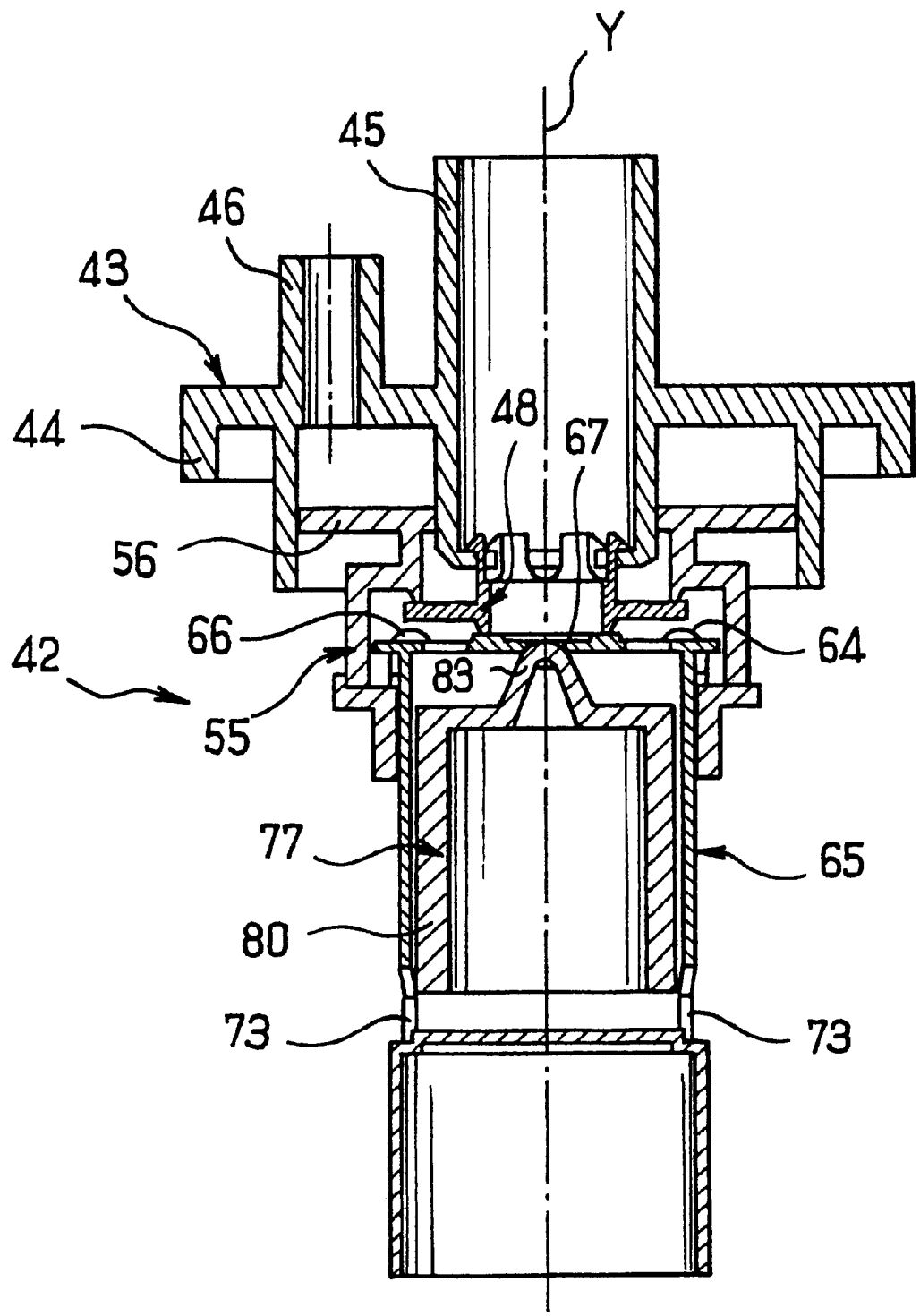
FIG. 6 is a section analogous to FIG. 4, showing the valve at the end of filling.

The valve 1 is fitted to a fuel tank 2 which is shown in part only in order to clarify the drawing.

A pump 3 takes fuel from the tank 2 and delivers it to the injectors 4 of the vehicle engine.

A regulator 5 is connected to the pump and to the injectors by respective ducts 6 and 7.

The regulator 5 uses a return duct 8 to return the fuel that is not consumed by the injectors 4 to the pump 3.

Together with the regulator 5 and the ducts 6 and 8, the pump 3 advantageously forms a unit which is inserted as a single item into the tank 2, as represented by dashed lines in FIGS. 1 and 2.

The valve 1 comprises a substantially tubular body 9 that is elongate along a substantially vertical axis X when the vehicle is at rest on a plane horizontal surface.

The body in the example described is made up by assembling a bottom portion 10 and a top portion 11.

A transverse partition 12 perpendicular to the axis X inside the body 9 defines a bottom compartment 13 and a top compartment 14.

A duct 16 connected to the degassing circuit passes through the top compartment 14 and the partition 12 to open out via an orifice 17 in the bottom compartment.

The valve 1 has a moving member 18 inside the body 9 enabling the configuration of the valve 1 to be changed depending on whether the tank is being filled with the engine stopped or whether the vehicle is running.

This member 18 has a skirt 19 capable of sliding along the axis X via an annular passage 21 passing through the partition 12.

The top end of the skirt 19 is connected to an annular piston 22 which extends perpendicularly to the axis X inside the top compartment 14 and which can bear against the partition 12 to prevent the member 18 from falling into the bottom compartment 13.

The above-mentioned piston 22 is dimensioned so as to be capable of sliding with a small amount of clearance in the top compartment 14.

The skirt 19 is extended radially inwards at its bottom end to form a rim 24 whose end 25 is raised and supports a first closure element 26 that is in the form of a disk.

The disk 26 can move inside the member 18 between the bottom end 27 of the duct 16 and the end 25 of the rim 24.

An orifice 29 passes through the center of the disk 26.

The skirt 19 is provided about halfway up with openings 30 whose function is explained below.

The valve 1 makes use of the suction created by the Venturi effect in a nozzle 31 integrated in the return duct 8 to cause the member 18 to move and change the configuration of the valve.

This nozzle 31 squirts a jet of fuel 32 into the inside of the duct at high speed as represented in FIG. 2, thereby causing suction to appear around the jet 32 by the Venturi effect, which suction is transferred to the top compartment 14 of the valve 1 by a suction duct 33.

This suction tends to raise the piston 22 together with the member 18, thus bringing the disk 26 into a position in which the orifice 17 is partially closed.

The bottom compartment 13 communicates with the inside of the tank via openings 34 provided in the bottom wall 35 of the valve 1.

A second closure element 36 whose top face includes a projection 37 centered on the axis X is movably received in the bottom compartment 13.

When the tank is in a normal position for use, this closure element 36 normally rests under its own weight against supports 38, and it co-operates with the side wall of the valve 1 to leave an annular space 40 that allows air and fuel vapor to reach the duct 16.

Gaps (not shown) are left between the supports 38.

The weight of the closure element 36 is suitable for maintaining the disk 26 in the position in which it closes the duct 16 in the event of the vehicle accidentally rolling over so that the tank is upside-down, since the projection 37 then closes the orifice 29 in the disk 26.

When the vehicle is at rest and the pump 13 is not operating, air and fuel vapor can penetrate into the bottom compartment 13 via the openings 34, reach the annular space 40 between the second closure element 36 and the body of the valve 1 via the gaps between the supports 38, and then reach the duct 16 via the openings 30 in the member 18 and the orifice 29 in the disk 26, as represented by arrows in FIG. 1.

When the vehicle is in operation, the jet 32 establishes suction in the duct 33, thereby causing the piston 22 to be sucked upwards.

The disk 26 is then pressed against the edge of the orifice 17 of the duct 16 so that the duct 16 communicates with the inside of the tank only via the orifice 29 of the disk 26.

Since this orifice 29 is of relatively small section, the tank is thus enabled to continue breathing while ensuring that any splashes due to waves of fuel in the tank 2 cannot penetrate into the duct 16.

In the event of the vehicle accidentally rolling over, the duct 16 is isolated from the tank 2 by means of the second closure element 36 which closes the orifice 29 in the disk 26 by means of its projection 37.

Naturally the above-described valve 1 can be associated with a spring (not shown) for compensating a fraction of the weight of the closure element and serving to close the valve in the event of the vehicle rolling onto its side.

FIGS. 3 to 8 show a valve 42 constituting a second embodiment of the invention.

This valve 42 has a fixed top portion 43 provided with a fixing collar 44 for engaging the wall of the tank (not shown), a central tube 45, and an off-center tube 46 serving respectively for connecting the valve 42 to the degassing circuit and to the suction duct as described above.

At its bottom end 46, the central tube 45 has a bottom rim 47 serving to secure a seat-forming element 48 that can move along the substantially vertical axis Y of the valve 42.

This seat-forming element 48 has an annular body 49 provided at its top end with catches 50 that hook onto the rim 47.

The body 49 is extended radially outwards in the vicinity of its bottom end by a collar 51.

An annular lip 52 projects beneath the collar 51 in line with the body 49.

The fixed top portion 43 of the valve 42 has a tubular skirt 53 disposed coaxially around the central tube 45 and defining an annular channel 54 thereabout with the off-center tube 46 opening out into the bottom of said channel.

The valve 42 has a member 55 that is vertically movable along the axis Y with the seat-forming element 48 being situated inside the member 55.

At its top portion, the member 55 has annular piston 56 disposed inside the channel 54 so as to slide with a small amount of clearance therein.

The piston 56 defines an annular chamber 57 inside the channel 54 that communicates via the tube 46 with the suction duct (not shown).

A wall 58 having a shoulder 59 extends the piston 56 downwards.

A guide ring 60 is fitted to the bottom end of the wall 58.

The wall 58 has an annular lip 61 which projects downwards onto the shoulder 59 so as to bear against the collar 61 of the seat-forming element 48 when the valve is in the configuration of FIG. 4.

The wall 58 also has a series of openings 64 situated beneath the shoulder 59 enabling communication to be established with the inside of the tank.

A first closure element 65 is slidably received in the guide ring 60.

This closure element 65 has a top wall 66 extending perpendicularly to the axis Y with a central orifice passing through its center.

On its side facing the seat-forming element 48, the top wall 66 has a slightly projecting annular bearing surface 68 against which the annular lip 52 can bear in substantially in leakproof manner when the valve 42 is in the configuration of FIG. 5, as explained below.

The top wall 66 is also pierced by orifices 69 situated radially outside the bearing surface 68.

When the valve 42 is at rest, as shown in FIG. 4, the top wall 66 rests via its periphery 70 on a shoulder 71 of the guide ring 60.

The top wall 66 is extended downwards by a cylindrical side wall 72 having openings 73 in its bottom portion.

An end element 75 is fitted to the bottom end of the side wall 72.

This end element 75 is open downwards only, and it contains a volume of air 76 that is sufficient to ensure that the first closure element presents positive buoyancy in the liquid fuel.

A second closure element 77 is received in the space 78 inside the side wall 72 between the top wall 66 of the first closure element 65 and the top wall 79 of the end element 75.

This closure element 77 has a cylindrical body 80 which is closed at its top end by a wall 81 and which opens out downwards only, so as to contain a volume of air 82 that is sufficient to ensure that it is buoyant in the liquid fuel.

The second closure element 77 has a projection 83 at its top end which is shaped to close the central orifice 67 in the top wall 66 of the first closure element 65 when the valve is in the configuration of FIG. 6, as explained below.

The valve 42 operates as follows.

During filling, the engine is switched off and the suction duct does not generate suction, such that the annular chamber 57 is at the same pressure as the air inside the tank.

The tank is also empty, such that the second closure element 77 subjects its entire weight to the first closure element 65, which itself rests entirely on the guide ring 60 of the member 55 which bears via the lip 61 on the collar 51 of the seat-forming element 48, as shown in FIG. 4.

The catches 50 of the seat-forming element 58 are hooked on the inside rim 47 of the tube 45 to hold up the assembly.

In this configuration, the valve 42 offers a maximum flow section to the flow of gas leaving the tank, as expelled by the incoming fuel.

This gas flow penetrates into the valve 42 mainly via the openings 64 and it passes through the seat-forming element 48 to reach the degassing duct via the central tube 45.

When the level of liquid fuel in the tank reaches the end element 75, the first closure element 65 rises progressively under the effect of the fuel rising in the tank until it comes into abutment via the bearing surface 68 against the lip 52 of the seat-forming element 48, as shown in FIG. 5.

In this configuration, the air and fuel vapor can reach the degassing duct only via the central orifice 67 of the top wall 66 of the first closure element 65, thereby increasing the head loss that the valve imparts on the flow of gas leaving the tank.

This makes the tank more difficult to fill, and causes the filling nozzle to trip for the first time.

When the level of fuel reaches the second closure element 77, it rises progressively until the projection 83 closes the central orifice 67 as shown in FIG. 6, thereby causing the filling nozzle to trip for a second or third time.

In this configuration, the valve is substantially closed and it is no longer possible to fill the tank.

This ensures that a buffer of gas is present above the level of liquid fuel in the tank and thus prevents the tank being overfilled.

When the engine is started, the suction duct generates suction and the piston 56 of the member 55 is moved upwards in the channel 54 by the suction.

As it moves, the member 55 entrains the first closure element 65 which in turn entrains the seat-forming element 48 until the collar 51 comes to bear against the bottom end of the tube 45, as shown in FIG. 8.

As a consequence of the upward movement of the first closure element 65, the central orifice 67 is no longer closed by the projection 83 of the second closure element 77.

Thus, even when the tank is full, communication is established immediately between the inside of the tank and the degassing circuit successively via the openings 64, the orifices 69, and the central orifice 67, thereby enabling the tank to breathe.

In the event of the fuel forming a wave in the tank, the second closure element 77 can rise and temporarily close the central orifice 67 as the wave sloshes past, thereby preventing liquid fuel being splashed into the tube 45.

Naturally, the invention is not limited to the embodiments described above.

Instead of using suction created by the operation of the gasoline pump, it is possible to use magnetic means, for example, to cause the member 18 to move upwards in the embodiment of FIGS. 1 and 2 or the member 55 to move upwards in the embodiment of FIGS. 3 to 8.

Such magnetic means could comprise, for example, a coil that is electrically excited so as to exert an electromagnetic force on the member 18 or 55, in which case said member should be magnetizable.

Finally, the invention provides means that are particularly reliable and safe for modifying the configuration of a fuel tank valve as a function of various states of the vehicle, and also makes it possible to avoid overfilling the tank and avoid any risk of liquid fuel being splashed into the cannister.

What is claimed is:

1. A valve for connection to a degassing circuit for a fuel tank of a vehicle, said valve comprising:
   at least one moving member capable of being controlled in displacement by an action other than the fuel level rising in the tank to modify the configuration of said valve,
   a first closure element having an orifice and suitable for being moved by the moving member from a first position towards a second position, the transition from the first position to the second position reducing a flow section available to a flow of gas leaving said fuel tank.

2. A valve according to claim 1, comprising a second closure element suitable for closing the orifice of said first closure element.

3. A valve according to claim 2, wherein said second closure element closes said orifice in the event of the vehicle accidentally rolling over.

4. A valve according to claim 2, wherein said second closure element presents positive buoyancy so as to close said orifice under the effect of a wave of fuel in the tank.

5. A valve according to claim 1, wherein when said first closure element is in its second position it bears against a fixed seat.

6. A valve according to claim 1, comprising a moving seat-forming element, wherein said first closure element bears against said seat-forming element when it is in its second position for partial closure.

7. A valve according to claim 1, wherein the first closure element needs to be moved upwards in order to go from the first position to the second position.

8. A motor vehicle fuel tank fitted with a valve as defined in claim 1.

9. A valve for connection to a degassing circuit for a fuel tank of a vehicle, said vehicle comprising an engine, said valve comprising:
- a member that is movable along a substantially vertical axis from a low position while the tank is being filled and the engine is switched off to a high position while the engine is running;
- a seat-forming element that is movable between a low position in which it is hooked on a fixed portion of the valve and supports the moving member, and a high position in which it comes into abutment against said fixed portion;
- a first closure element presenting an orifice and that is movable when the moving member is in its low position between a first position in which it is spaced apart from said seat-forming element and a second position in which it bears against said seat-forming element and reduces a flow section available to a flow of gas leaving the valve, allowing the flow to take place through said orifice only, said first closure element presenting positive buoyancy so as to go from its first position towards its second position under the effect of the fuel rising in the tank;
- a second closure element that is movable relative to the first closure element between a first position in which its weight acts on the first closure element and a second position in which it closes said orifice, said second closure element presenting positive buoyancy so as go from its first position towards its second position under the effect of the liquid fuel rising in the tank and close the valve when the tank is at the end of filling and the engine is switched off, the moving member then being in its low position;
- in which valve, once the engine is running, the moving member is in its high position and has entrained the seat-forming element into a high position with the first closure element held to bear against the seat-forming element by said moving member, the orifice of the first closure element then being normally open in the absence of waves of fuel in the tank, and the second closure element being suitable for closing said orifice under the effect of a wave of fuel in the tank.

10. A valve for connection to a degassing circuit for a fuel tank of a vehicle, comprising:
- at least one moving member capable of being moved under the effect of a fuel pump operating,
- a first closure element having an orifice and suitable for being moved by the moving member from a first position towards a second position, the transition from the first position to the second position reducing a flow section available to a flow of gas leaving the fuel tank.

11. A valve according to claim 10, wherein the valve is configured so that the moving member is moved from the first position to the second position under the effect of a variation in pressure created by the pump operating.

12. A valve according to claim 11, wherein said variation in pressure is suction created by the Venturi effect.

13. A valve for connection to a degassing circuit for a fuel tank of a vehicle, said valve comprising:
- at least one moving member,
- a first closure element having an orifice and suitable for being moved by the moving member from a first position towards a second position, the transition from the first position to the second position reducing a flow section available to a flow of gas leaving the fuel tank,
- a moving seat-forming element against which said first closure element bears when it is in its second position, said seat-forming element being movable between a position in which it comes into abutment against said moving member and a position in which it is engaged with a rim of a fixed portion of the valve.

14. A valve according to claim 13, wherein said first closure element presents positive buoyancy and wherein the valve is arranged in such a manner that said first closure element takes up its second position for partial closure under the effect of the liquid fuel rising in the tank at the end of filling.

15. A valve according to claim 13, wherein said moving member is capable of being controlled in displacement by an action other than the fuel level rising in the tank to modify the configuration of said valve.

16. A valve for connection to a degassing circuit for a fuel tank of a vehicle, said vehicle comprising an engine, said valve comprising:
- at least one moving member having a position dependent on whether the engine of the vehicle is running or not,
- a first closure element having an orifice and suitable for being moved by the moving member from a first position towards a second position, the transition from the first position to the second position reducing a flow section available to a flow of gas leaving the fuel tank.

17. A valve according to claim 16, wherein said moving member is capable of being controlled in displacement by an action other than the fuel level rising in the tank to modify the configuration of said valve.

* * * * *